United States Patent
Williams

(10) Patent No.: US 8,700,402 B2
(45) Date of Patent: **\*Apr. 15, 2014**

(54) SYSTEM AND METHOD FOR EFFICIENT TRACKING OF MULTIPLE DIALOG STATES WITH INCREMENTAL RECOMBINATION

(71) Applicant: AT&T Intellectual Property I, L.P., Atlanta, GA (US)

(72) Inventor: Jason Williams, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,409

(22) Filed: Jun. 4, 2013

(65) Prior Publication Data
US 2013/0268274 A1 Oct. 10, 2013

Related U.S. Application Data

(63) Continuation of application No. 12/633,315, filed on Dec. 8, 2009, now Pat. No. 8,457,968.

(51) Int. Cl.
*G10L 15/04* (2013.01)

(52) U.S. Cl.
USPC .......................... 704/251; 704/245; 704/244

(58) Field of Classification Search
USPC ............. 704/216, 270, 270.1, 243–245, 251, 704/257
See application file for complete search history.

(56) References Cited

U.S. PATENT DOCUMENTS 7,457,745 B2 * 11/2008 Kadambe et al. ............. 704/216
7,634,406 B2 * 12/2009 Li et al. ........................ 704/244

* cited by examiner

*Primary Examiner* — Huyen X. Vo

(57) ABSTRACT

Disclosed herein are systems, methods, and computer-readable storage media for tracking multiple dialog states. A system practicing the method receives an N-best list of speech recognition candidates, a list of current partitions, and a belief for each of the current partitions. A partition is a group of dialog states. In an outer loop, the system iterates over the N-best list of speech recognition candidates. In an inner loop, the system performs a split, update, and recombination process to generate a fixed number of partitions after each speech recognition candidate in the N-best list. The system recognizes speech based on the N-best list and the fixed number of partitions. The split process can perform all possible splits on all partitions. The update process can compute an estimated new belief. The estimated new belief can be a product of ASR reliability, user likelihood to produce this action, and an original belief.

20 Claims, 5 Drawing Sheets

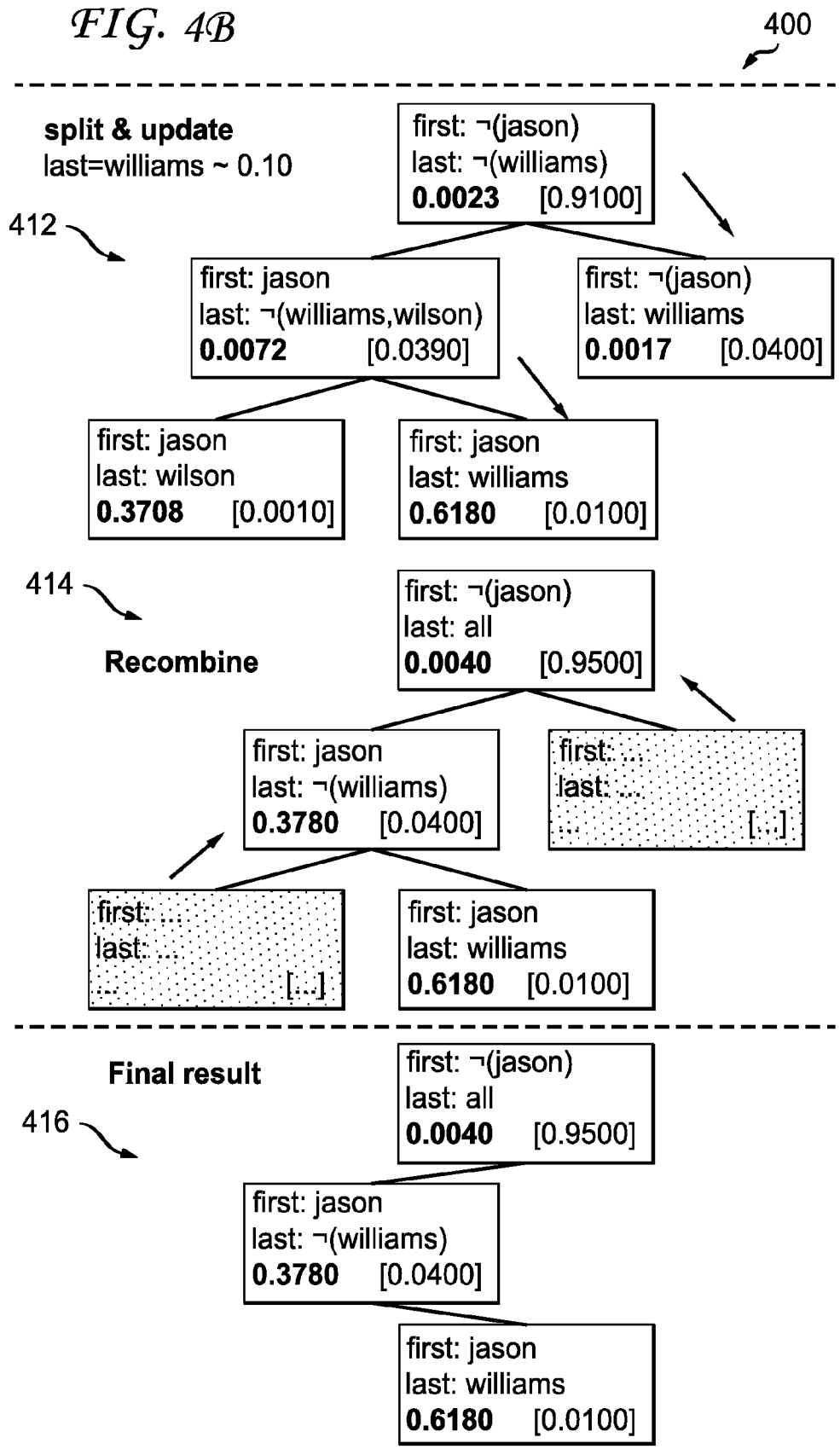

SYSTEM AND METHOD FOR EFFICIENT TRACKING OF MULTIPLE DIALOG STATES WITH INCREMENTAL RECOMBINATION

PRIORITY INFORMATION

The present application is a continuation of U.S. patent application Ser. No. 12/633,315, filed Dec. 8, 2009, the contents of which is incorporated by reference in its entirety.

BACKGROUND

1. Technical Field

The present disclosure relates to spoken dialog systems and more specifically to tracking a distribution over multiple dialog states in a spoken dialog system.

2. Introduction

Speech recognition and automated dialog technology is imperfect and the output from automatic speech recognition (ASR) engines often contains errors. Spoken dialog systems cope with these errors in various ways. Traditional systems track a single dialog state using a form structure. For example, in the travel domain, a form can contain fields for "departure city" and "arrival city." If the caller says "I want to fly to Boston" then the traditional system populates the "arrival city" field with the value BOSTON.

The conventional approach is problematic in that it requires numerous heuristics to decide how to interpret the results from the speech recognizer. Conflicts arise when the speech recognizer detects a different value for a field which has already been populated. Dealing with such conflicts is particularly difficult, because inevitably the system must discard either the old or new information. In sum, there is no principled way to create all of these heuristics. Many are based on intuition and thus conventional systems discard much useful information.

One alternative is to maintain a probability distribution over all possible forms, otherwise known as dialog states. This approach assigns a probability of correctness to every possible dialog state rather than tracking a single dialog state. In practice such systems cannot track all the possible dialog states because they are far too numerous, even for a dialog of modest size. Instead the system tracks probabilities for groups of dialog states, called partitions. Initially one partition contains all dialog states. As the dialog system progresses, the system splits partitions as needed to capture distinctions implied by the items on the ASR N-best list. For example, if the system recognizes "to boston," then one partition represents all itineraries to Boston, and another represents all itineraries to other cities. Then if the system recognizes "from new york," the system creates four partitions: (1) from new york to boston, (2) from [any city but new york] to boston, (3) from new york to [any city but boston], and (4) [any city but new york] to [any city but boston]. The dialog system tracks a probability of correctness for each partition, updated based on ASR score, agreement with the user's profile, etc. The conventional system accommodates conflicting evidence by splitting partitions and shifting probability mass between partitions. All of the information on the N-best list can be used by comparing each N-best list entry to each partition.

However, as the dialog progresses, this splitting operation produces an ever increasing number of partitions. One way to prevent the number of partitions from becoming so large that updates are not possible in real-time is to recombine (merge) low-probability partitions and ignore the distinctions between the dialog states they represent. For example, if the two partitions "Flights from Boston to New York" and "Flights from [any city but Boston] to New York" are recombined, the resulting partition would be "Flights from [anywhere] to New York."

Current techniques perform recombination at the end of each update. They first perform all possible splits considering the entire N-best list, then compute the new belief in this larger set of partitions, then finally recombine low-belief partitions. While this limits growth in the number of partitions across updates, it does not limit growth within an update. The problem is that the number of partitions is, at worst, exponential in the length of the ASR N-best list. As a result, the number of N-best entries that can be considered is limited to a small number, only 2 or 3 ASR N-best hypotheses in state-of-the-art systems.

In sum, while partition-based methods are promising, they currently cannot make use of more than a very limited number of entries on the N-best list. So despite their theoretical promise, in practice their ability to improve whole-dialog accuracy rates, task completion, and user satisfaction is substantially limited.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 4A and 4B are two parts of an example belief monitoring illustration.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
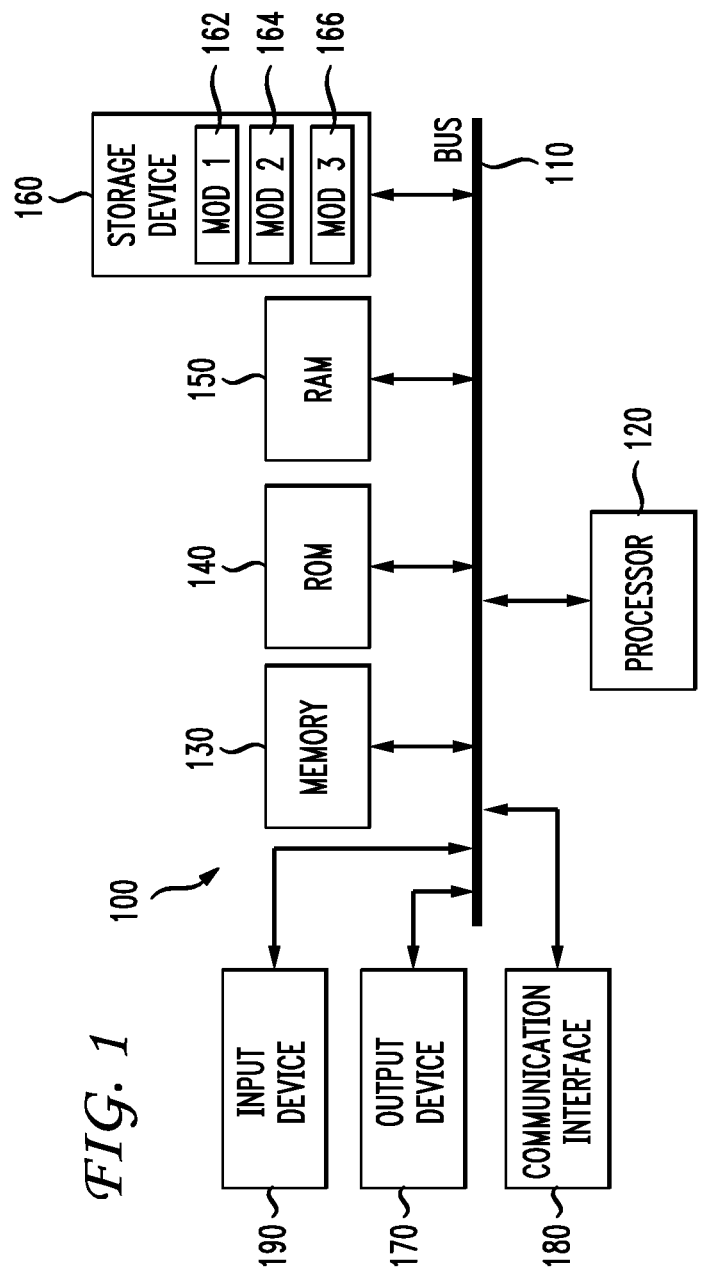
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Spoken dialog systems cope with recognition errors in various ways. Disclosed herein is an approach to make use of a wider range of entries on an N-best list in speech recognition and/or automated spoken dialogs. The approach disclosed herein incrementally recombines partitions of an N-best list by performing a split/update/recombination cycle for each N-best list item. The number of partitions remains relatively constant during an update, rendering the update approximately linear in the length of the N-best list. As a result, a spoken dialog system can consider a greater quantity of N-best items within a given time frame.

The following review of the mechanics of tracking multiple dialog states, broadly following the Spoken Dialog System—Partially Observable Markov Decision Process (SDS-POMDP) model, is background information which is helpful in understanding the issue. At each turn, the user has some goal g in mind (e.g., the name and location of a person they want to call). The system 100 then takes an action a (e.g., "What's the last name of the person you want to call?"), and user replies with an action u ("Smith"). Other sets of goals, actions, and user replies exist. The speech recognizer processes this audio and produces an N-best list of hypotheses $\tilde{u}=\{\tilde{u}_1, \ldots, \tilde{u}_N\}$, along with an estimate of how likely user actions are to be correct $P(u|\tilde{u})$. A history variable h tracks relevant dialog history, such as which slots have been confirmed, a likelihood of the confirmation, etc. Because speech recognition is error-prone, the system cannot directly observe g, u, and h. Instead the system maintains a distribution over these quantities b. Given some existing distribution $b(g, h)$, and observations a and $\tilde{u}$, an updated distribution $b'(g', h')$ can be computed as shown in the following equation:

$$b'(g', h') = \quad (1)$$
$$\eta \cdot \sum_{u'} P(u' \mid \tilde{u}') \sum_h P(u' \mid g', h, a) \cdot P(h' \mid g', u', h, a) \sum_g P(g' \mid a, g) b(g, h)$$

where P(u'|g',h,a) indicates how likely user actions are, P(h'|g',h,a) indicates how the dialog history evolves, and P(g'|a,g) indicates how the user's goal may change.

A typical dialog system includes an astronomical number of possible user goals. Computing this update directly in real time is impossible. One way of overcoming this is to maintain a distribution over a set of partitions of user goals $\{p_1, \ldots, p_M\}$, where each partition $p_m$ is a collection of user goals, and each user goal belongs to exactly one partition.

To perform an update over partitions, the system assumes that the user's goal is fixed throughout the dialog, and that ASR confusions between elements not on the ASR N-best list are all uniform. Together, these assumptions lead to the following equation:

$$b'(p', h') = \quad (2)$$
$$\eta \cdot \sum_{u'} P(u' \mid \tilde{u}') \cdot \sum_{h \in p'} P(u' \mid p', h, a) P(h' \mid p', u', h, a) P(p' \mid p) b(g, h)$$

where P(p'|p) indicates the fraction of belief in p which p' would hold if p were split into p' and p-p'. This fraction can be viewed as the ratio of priors of p' and p.

Current techniques implement equation (2) above by the following steps: first, comparing each N-best entry to each partition; second, if the user action can sub-divide the partition, splitting the partition; third, updating the belief in each partition (and its associated dialog histories) according to equation (2). Finally, to prevent the number of partitions from growing arbitrarily over the course of the dialog, low-belief partitions are recombined by summing their beliefs such that the distinctions between them are lost.

In the worst case, the number of partitions produced by splitting is exponential in the length of the N-best list. For example, consider an N-best list with three items: Jacob (a first name), Jacobs (a last name), and Jackson (a city name). Because the items are semantically orthogonal (i.e., they all fill different slots such that none preclude another), each can cause all partitions to split, yielding a large set of partitions to update. In practice this property limits the number of N-best items to a small number, which is significant because there is often useful information further down the N-best list. The approach disclosed herein overcomes this limitation by performing recombination incrementally, as described below. In sum, the approach disclosed herein can exploit the theoretical benefits of maintaining a distribution over dialog states in practice.

Figure 2:
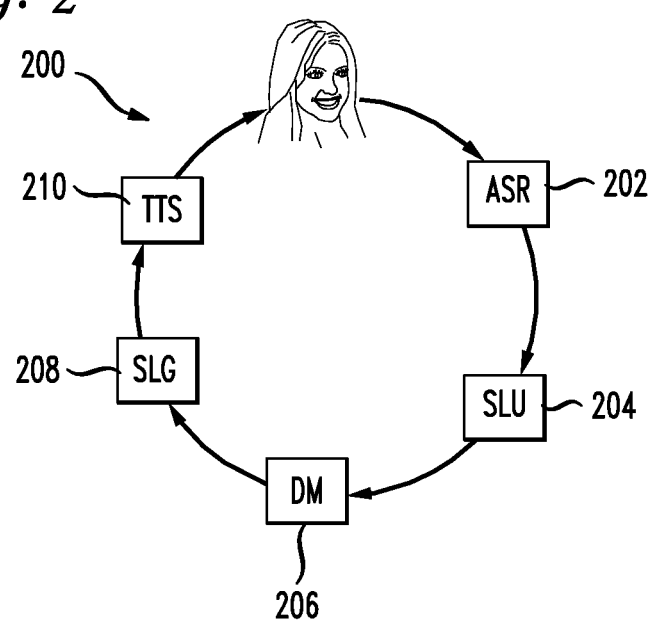
FIG. 2 illustrates a functional block diagram of an exemplary natural language spoken dialog system.

FIG. 2 illustrates a functional block diagram of an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module represents any type of speech output.

The present disclosure focuses on innovations related to the DM module 206 and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2.

Figure 3:
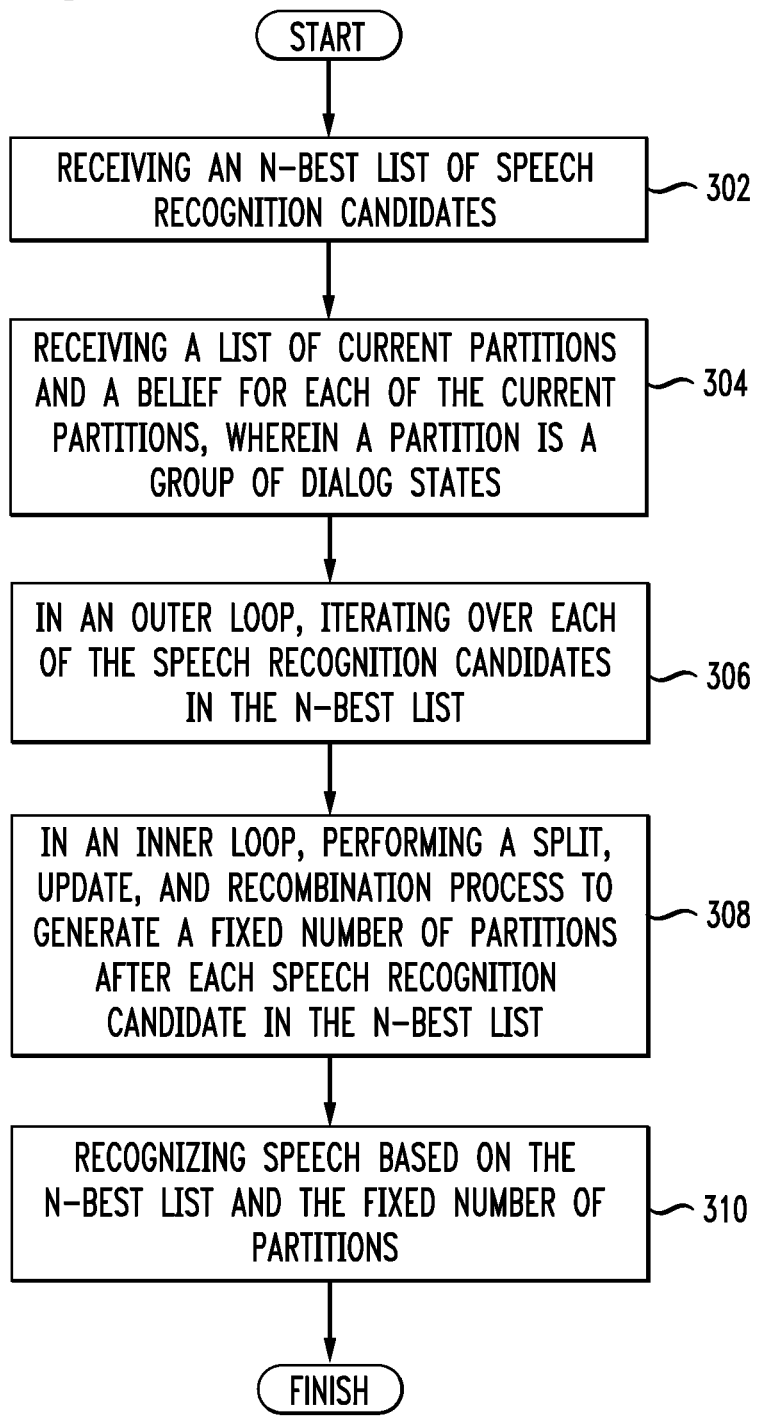
FIG. 3 illustrates an example method embodiment for incremental partition recombination for tracking multiple dialog states.

Having disclosed some basic system components, the disclosure now turns to the exemplary method embodiment shown in FIG. 3. For the sake of clarity, the method is discussed in terms of an exemplary system 100 such as is shown in FIG. 1 configured to practice the method. This disclosure teaches an update technique which exchanges the inner and outer loops as they are used in current update techniques. In the outer loop disclosed herein, a spoken dialog system (SDS) iterates over N-best entries. The inner loop performs a split, update, and recombination process to create a fixed number of partitions after each N-best item. This approach keeps the number of partitions roughly constant throughout the update, which renders the update approximately linear in the length of the N-best list.

FIG. 3 illustrates an example method embodiment for incremental partition recombination for tracking multiple dialog states. The system 100 receives an N-best list of speech recognition candidates (302). The system 100 receives a list of current partitions and a belief for each of the current partitions, wherein a partition is a group of dialog states (304). For each N-best list item, the algorithm performs all possible splits on all partitions. For example, if the N-best entry is "TO Boston", the algorithm can split a partition representing "All flights FROM New York" into "Flights FROM New York TO Boston" and "Flights FROM New York TO [cities other than Boston]". However the algorithm does not split partitions in N-best entry "TO Boston" where the "to" slot is already filled, such as "All flights TO Chicago".

In an outer loop, the system 100 iterates over each of the speech recognition candidates in the N-best list (306). In an inner loop, the system 100 performs a split, update, and recombination process to generate a fixed number of partitions after each speech recognition candidate in the N-best list (308). The exemplary belief monitoring illustration shown in FIG. 4 depicts one example of how the split, update, and recombination processes work together. The example Python source code below illustrates one possible structure and implementation for the outer loop (section #2) and inner loop (sections #3, #4, #5, and #6).

The split process can perform all possible splits on all partitions. In one aspect, the update process computes an estimated new belief for each partition. The new belief is based on the reliability of the ASR process, the likelihood that the user would produce this action, and/or the original belief. The new belief can also include a term which accounts for the ASR probability of an action which has not yet been observed, corresponding to $P(u'|\tilde{u}')$ in equation 2. The estimated new belief can further include a term which accounts for the likelihood of a user taking an action which has not yet appeared on the N-Best list, corresponding to $P(u'|p',h,a)$ in equation 2.

The system 100 can then recombine partitions until there are fewer than a specified number. To recombine two partitions, the algorithm ignores distinctions between them. For example, if the two partitions "Flights from Boston to New York" and "Flights from [any city but Boston] to New York" are recombined, the resulting partition would be "Flights from [anywhere] to New York." In one aspect, the algorithm recombines starting at the least likely partition. After completing these steps, the algorithm moves on to the next item in the N-best list.

In one aspect, the incremental partition recombination approach exchanges the inner and outer loops of existing update techniques. In the outer loop, the approach iterates over N-best entries. The inner loop performs the split/update/recombination process, such that after each N-best item there are at most maxPartitions. This keeps the number of partitions roughly constant throughout the update, which renders the update approximately linear in the length of the N-best list. The full algorithm updates a set of partitions and the dialog histories associated with each. The description herein is limited to the partition update process. In practice, dialog histories are deterministic functions, so incorporating them into the update is conceptually straightforward. The system 100 then recognizes speech based on the N-best list and the fixed number of partitions (310).

In one aspect, partitions are programmatic objects which support a small set of simple methods, such as splitting childPartitions=p.Split(ua) or obtaining a prior p.Prior( ). This is a departure from existing work which implements partitions in a rule-based formalism. The object-oriented view can be a useful generalization which provides substantial flexibility to application developers. This view is also an accessible form of expression to the commercial software development community. The exemplary Python source code below demonstrates an algorithm for updating the belief state, although similar or equivalent code can be generated in other programming languages or combinations of software and hardware.

```
def Update(partitions,nBestList, sysAction,maxPartitions):
    # 1) INITIALIZE for p in partitions:
        p.uaProbTot = 0.0
        p.origBel = p.belief
        p.onListBel = 0.0
        p.belEst = None
    # 2) ITERATE OVER N-BEST LIST
    for (ua,asrProb,asrOffListProb) in nBestList:
        # 3) SPLIT ON USER ACTION (ua)
        i = 0
        while (i < len(partitions)):
            p = partitions[i]
            i += 1
            newPartitions = p.Split(ua,sysAction)
            # 4) REFINE BELIEF IN NEW PARTITIONS
            for np in newPartitions:
                p.children.append(np)
                np.uaProbTot = p.uaProbTot
                frac = np.prior / (np.prior + p.Prior( ))
                np.onListBel = p.onListBel * frac
                np.origBel = p.origBel * frac
                np.parent = p
                p.onListBel -= np.onListBel
                p.origBel -= np.origBel
                partitions.append(np)
            # 5) UPDATE ESTIMATED BELIEF
            uaProb = p.UAProb(ua,sysAction)
            p.uaProbTot += uaProb
            p.onListBel += uaProb * asrProb * p.origBel
            offListBel = asrOffListProb * (1-p.uaProbTot) * p.origBel
            p.belEst = p.onListBel + offListBel
        # 6) RECOMBINE
        while (len(partitions) > maxPartitions):
            SortByBelEst(partitions)
            for p in partitions:
                if (len(p.children) > 0):
                    continue
                pp = p.parent
                # p.parent OF ROOT PARTITION == None
                if (not pp == None and pp.Recombine(p)):
                    # pp.Recombine(p) RETURNS TRUE IF p WAS
                    # RECOMBINED WITH pp
                    pp.origBel += p.origBel
                    pp.onListBel += p.onListBel
                    pp.belEst += p.belEst
                    pp.uaProbTot = min(pp.uaProbTot,p.uaProbTot)
                    pp.children.remove(p)
                    partitions.remove(p)
                    break
    # 7) NORMALIZE AND CLEAN UP
    SortByBelEst(partitions)
    t = sum([p.belEst for p in partitions])
    for p in partitions:
        p.belief = p.belEst / t
```

For each N-best list item (#2 in the exemplary code above), the partition update code receives an object with the contents of the user action $\tilde{u}=ua$, an estimate of its correctness $P(u|\tilde{u})$=asrProb, and an estimate of the correctness of an action not on the N-best list so far, $P(u \notin \tilde{u}|\tilde{u})$=asrOffListProb. For this user action, the update performs all possible splits on the current set of partitions (#3 in the exemplary code above). When a child is split from a parent partition, the code subdivides belief according to the priors of the parent and child (#4 in the exemplary code above). The code then computes the estimated belief in each partition (#5 in the exemplary code above). The code computes #2 using only the sub-set of the N-best list encountered thus far in the update (on ListBel). A special action that represents all actions not (yet) encountered in the update is assumed, u*. In the exemplary code, the likelihood of the user taking this special action $P(u*|p, a)$ is (1−uaProbTot), and its ASR likelihood $P(u*|\tilde{u})$ is asrOffListProb.

If splitting has increased the total number of partitions to more than maxPartitions, the update recombines (#6 in the exemplary code above) by attempting to combine low-belief leaf partitions with their parents. The estimated belief of the combined partition is the sum of its predecessors. The code sets the sum of observed user actions uaProbTot to the minimum of its predecessors. This heuristic approach ensures that the sum of user action probabilities for any partition is always ≤1. This recombination continues until there are at most max-Partitions. Finally the code normalizes estimated beliefs to form the new belief (#7 in the exemplary code above).

Figure 4A:
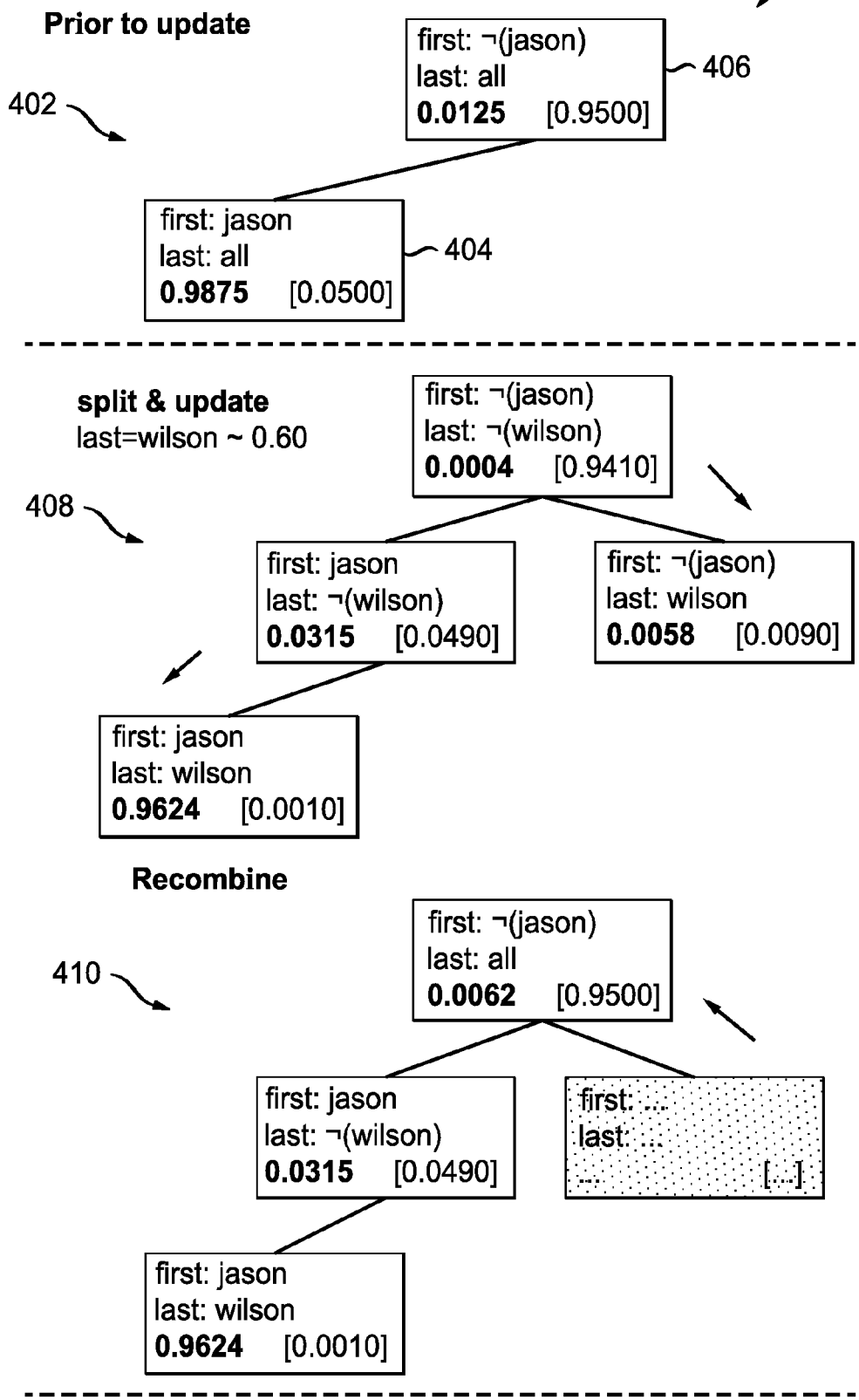

One result of this approach is that a spoken dialog system can consider more N-best list entries in a given amount of processing time. This is a benefit because considering entries further down the N-best list can yield new partitions with higher whole-dialog belief despite their lower ASR scores. FIGS. 4A and 4B illustrate an exemplary belief monitoring 400 in a simple first name/last name dialog. FIG. 4A illustrates a state prior to the update process 402, a first split and update step 408, and a first recombination step 410. FIG. 4B is a continuation from FIG. 4A, illustrating a second split and update step 412, a second recombination step 414, and the final result 416. In this example, at the end of each recombination step 410, 414 the number of partitions is no greater than three. In the recombination steps, the system 100 merges the shaded boxes into their parent partition to achieve the proper number of partitions. In other implementations, the number of partitions can be higher or lower or dynamically selected based on available resources, such as memory and/or processor cycles. Each box represents a partition. Bold numbers represent belief and bracketed numbers represent priors. FIGS. 4A and 4B illustrate processing 2 N-best list entries, the last names "Wilson" 408, 410 and "Williams" 412, 414 which the ASR engine estimates are 60% and 10% likely to be correct, respectively. At the start 402 of the update two partitions exist—people with "Jason" as their first name 404, and everyone else 406. The ASR N-best list contains 2 last names, "Wilson" (with ASR likelihood 0.60) and "Williams" (with ASR likelihood 0.10). In this example, the prior probability of "Jason Wilson" is 0.001, "Jason Williams" is 0.01, and "Jason" (with any last name) is 0.05.

After the final split, update, and recombination steps, the belief for the name "Jason Williams" is 0.6180, the belief for the name "Jason" and any last name but "Williams" is 0.3780, and the belief for any name but "Jason" with all last names is 0.0040. The belief synthesizes both the prior and the ASR likelihoods, and the update correctly identifies "Jason Williams" as having a higher belief than "Jason Wilson" without first enumerating all possible partitions. In this example, the ASR evidence for "Jason Williams" was somewhat lower than for "Jason Wilson" (0.10 vs 0.60), but the prior of "Jason Williams" was much higher than for "Jason Wilson". The belief synthesizes the prior together with the evidence, and "Jason Williams" receives the highest belief overall. In one aspect, a spoken dialog system also tracks dialog histories for each partition, and can allow a limited classes of goal changes.

Partitions provide a way to maintain multiple dialog state hypotheses in a spoken dialog system. However because the number of partitions can grow exponentially in the length of the N-best list, current techniques are limited to considering a small number of N-best list entries. The techniques disclosed herein provide a method to overcome this limitation by performing recombination incrementally within each update, rendering the update roughly linear in the number of N-best entries. Spoken dialog systems implementing incremental recombination achieve higher full-dialog accuracy in less time.

This approach enables the construction of dialog systems which obtain higher task completion rates and which engage in faster, more intelligent dialogs without the requirement of significant additional resources. In the absence of perfect speech recognition, maintaining a distribution over dialog states is one of the best ways to improve dialog system performance. The underlying reason for the gain is the ability to make use of many alternatives on the ASR N-best list. This approach allows a spoken dialog system to consider many more items in a fraction of the time.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. The principles disclosed herein can enable many new applications such as a speech-enabled electronic program guide (EPG) for television in noisy environments like the family room where speech recognition errors will be common, mobile applications such as directory assistance, Yellow Pages searches, or multi-modal interactions on devices such as the iPhone in a variety of challenging out-of-home environments like cars, trains, and airports.

Returning to customer care, this disclosure enables the development of previously infeasible customer care applications for tasks such as troubleshooting or mobile phone configuration. Those skilled in the art will readily recognize various modifications and changes that may be made to the principles described herein without following the example embodiments and applications illustrated and described herein, and without departing from the spirit and scope of the disclosure.

I claim:

1. A method comprising:
receiving a list of speech recognition candidates;
receiving a list of current partitions, wherein each partition in the list of current partitions is a group of dialog states;
in an outer loop, iterating over each of the speech recognition candidates in the list of speech recognition candidates;
in an inner loop, performing a split process, an update process, and a recombination process, via a processor, wherein additional partitions are added to the current partitions after each speech recognition candidate in the list such that each speech recognition candidate has a fixed number; and
recognizing speech based on the list and the fixed number of partitions.

2. The method of claim 1, wherein the split process performs all possible splits on all partitions.

3. The method of claim 1, wherein the update process computes an estimated new belief.

4. The method of claim 3, wherein the estimated new belief is a product of one of a reliability of automatic speech recognition, a likelihood that a user would produce an action, and an original belief.

5. The method of claim 3, wherein the estimated new belief comprises a term which accounts for actions not yet observed.

6. The method of claim 1, wherein the recombination process ignores distinctions between two partitions when recombining the two partitions.

7. The method of claim 1, wherein the recombination process starts with a least likely partition.

8. A system comprising:
a processor; and
a computer-readable storage medium having instructions stored which, when executed by the processor, cause the processor to perform operations comprising:
receiving a list of speech recognition candidates;
receiving a list of current partitions, wherein each partition in the list of current partitions is a group of dialog states;
in an outer loop, iterating over each of the speech recognition candidates in the list of speech recognition candidates;
in an inner loop, performing a split process, an update process, and a recombination process via the processor, wherein additional partitions are added to the current partitions after each speech recognition candidate in the list such that each speech recognition candidate has a fixed number; and
recognizing speech based on the list and the fixed number of partitions.

9. The system of claim 8, wherein the split process performs all possible splits on all partitions.

10. The system of claim 8, wherein the update process computes an estimated new belief.

11. The system of claim 10, wherein the estimated new belief is a product of one of a reliability of automatic speech recognition, a likelihood that a user would produce an action, and an original belief.

12. The system of claim 10, wherein the estimated new belief comprises a term which accounts for actions not yet observed.

13. The system of claim 8, wherein the recombination process ignores distinctions between two partitions when recombining the two partitions.

14. The system of claim 8, wherein the recombination process starts with a least likely partition.

15. A computer-readable storage device having instructions stored which, when executed by a computing device, cause the computing device to perform operations comprising:
receiving a list of speech recognition candidates;
receiving a list of current partitions, wherein each partition in the list of current partitions is a group of dialog states;
in an outer loop, iterating over each of the speech recognition candidates in the list of speech recognition candidates;
in an inner loop, performing a split process, an update process, and a recombination process, via the processor, wherein additional partitions are added to the current partitions after each speech recognition candidate in the list such that each speech recognition candidate has a fixed number; and
recognizing speech based on the list and the fixed number of partitions.

16. The computer-readable storage device of claim 15, wherein the split process performs all possible splits on all partitions.

17. The computer-readable storage device of claim 15, wherein the update process computes an estimated new belief.

18. The computer-readable storage device of claim 17, wherein the estimated new belief is a product of one of a reliability of automatic speech recognition, a likelihood that a user would produce an action, and an original belief.

19. The computer-readable storage device of claim 18, wherein the estimated new belief comprises a term which accounts for actions not yet observed.

20. The computer-readable storage device of claim 17, wherein the recombination process ignores distinctions between two partitions when recombining the two partitions.

* * * * *